United States Patent [19]

Farrell

[11] Patent Number: 5,929,596
[45] Date of Patent: Jul. 27, 1999

[54] ELECTRIC VEHICLE ASSEMBLY CIRCUIT

[76] Inventor: James Farrell, 903 2nd St., Stone Mountain, Ga. 30083-3017

[21] Appl. No.: 09/054,693

[22] Filed: Apr. 3, 1998

[51] Int. Cl.$^6$ .................................................. H01M 10/46
[52] U.S. Cl. .................................. 320/104; 320/DIG. 34; 180/65.1
[58] Field of Search ..................................... 320/104, 110, 320/118, 119, 123, 132, DIG. 34; D13/104; 322/14, 39, 44, 45, 88; 180/65.1, 65.3

[56] References Cited

U.S. PATENT DOCUMENTS

| | | |
|---|---|---|
| 5,414,863 | 5/1995 | Lee et al. . |
| 5,453,930 | 9/1995 | Imaseki et al. . |
| 5,528,087 | 6/1996 | Sibata et al. . |
| 5,610,498 | 3/1997 | Oh . |

*Primary Examiner*—Edward H. Tso
*Attorney, Agent, or Firm*—Michael I. Kroll

[57] ABSTRACT

An electric vehicle assembly circuit connected to a battery of an electric vehicle for charging the vehicle batteries during operation and thereby increasing the distance the vehicle is able to travel between battery charges. The vehicle batteries are divided into first, second, third and fourth sets of batteries. The electric vehicle assembly circuit includes a first processor connected to the first set of batteries, a first controller connected to receive power from said first processor and an alternator. A device is connected between the first controller and the alternator for driving the alternator. A second controller is connected to the alternator for charging the second and third sets of batteries during operation of the vehicle. A first converter connected to said alternator for providing a constant charge to the first set of batteries. A first relay is positioned between the first converter and the lights and horn of the vehicle for providing a constant power to the lights and horn. A second relay connects said first converter and a propulsion system of the vehicle providing power to the propulsion system during operation. An AC charger receives power from an external source for charging the first, second, third and fourth sets of batteries and a third relay disconnects the propulsion system from the first converter when the AC charger is receiving power from an external source.

13 Claims, 5 Drawing Sheets

| FIG 1C | FIG 1D |
|---|---|
| FIG 1A | FIG 1B |

FIG 1

ELECTRIC VEHICLE ASSEMBLY CIRCUIT

ELECTRIC VEHICLE ASSEMBLY CIRCUIT

BACKGROUND OF THE INVENTION

1. Field of the Invention

The present invention relates generally to motorized electric vehicles and, more specifically, to an electric vehicle assembly circuit connected within a vehicle that will extend the operating range of the vehicle battery by charging the battery during use.

2. Description of the Prior Art

Numerous devices for extending operating life of a vehicle battery have been provided in the prior art. Hybrid systems are available which will extend the operating range of the batteries by supplying an additional charge to the batteries, such as by the addition of an internal combustion engine. The addition of such a hybrid system has an added level of complexity which makes these vehicles an undesirable alternative. The purpose of the electric vehicle being to eliminate the need to use fossil fuels for personal transportation vehicles which are a major source of air pollution and are rapidly depleting the earth's natural resources.

Even though great strides have been made in battery development, a cost effective power supply for electric vehicles has yet to be achieved. Conventional electric vehicles are small in size providing only two seats for passengers and require at least 24 batteries to provide sufficient power for driving. Such vehicles are able to travel a distance of between 60–90 miles between battery charges. The batteries must be charged for a period of 6–15 hours at this time.

For example, U.S. Pat. Nos. 5,414,863; 5,453,930; 5,528,087 and 5,610,498 all are illustrative of such prior art. Thus, while these units may be suitable for the particular purpose to which they address, they would not be as suitable for the purposes of the present invention as heretofore described.

It is therefore, desirable to produce an electric vehicle which requires a fewer number of batteries to provide a sufficient charge. It is further desirable to produce an electric vehicle able to travel a greater distance between charging of the battery. It is even further desirable to produce an electric vehicle able to partially recharge the batteries during use which will extend the operating range of the batteries. A yet further object of the present invention is to produce an electric vehicle which will not completely drain the power within the batteries thus eliminating the need for long recharging periods. A still further object of the present invention is to produce an electric vehicle which will accommodate more than two passengers and able to achieve a high speed for travel on major thoroughfares. It is still further desirable to produce an electric vehicle able to provide the necessary power for operation of all the comforts and functions found in conventional gasoline driven vehicles such as a sound system, climate control system, electric windows, electric door locks, electrically adjustable seats, cruise control without limiting the operating distance the vehicle can travel or polluting the environment.

U.S. Pat. No. 5,414,863

Inventor: Robert H. J. Lee et al.

Issued: May 9, 1995

A power control circuit for a device such as a personal computer, including a laptop or notebook computer, which can conserve battery use, prevent power surges to promote longer battery charges and longer battery life, and can assure that circuitry is correctly biased. The power control circuitry of the present invention achieves these objectives by appropriately staggering the powering on of circuit components of the computer. A circuit for achieving these objectives may feature at least one memory for storing power control state data and a multiplexer for receiving the power control state data stored in the at least one memory. Further, a plurality of serially connected power control output circuits connected to the multiplexer output power control signals based on the power control state data stored in the at least one memory. A first of the plurality of serially connected power control output circuits has a minimum delay and each succeeding of the plurality of serially connected power control output circuits has an increasing delay.

U.S. Pat. No. 5,453,930

Inventor: Takashi Imaseki et al.

Issued: Sep. 26, 1995

A wheel motor drive system for electric automobiles comprises a car battery mounted on a vehicle body, at least two electric motors connected to vehicle wheels independently of each other, each of the motors having inherent torque characteristics with regard to a rotational speed and a maximum torque, sensors for monitoring a vehicle traveling condition and the torque characteristics of the motors for controlling the motors at a low power consumption mode wherein at least one of the motors is driven within a high motor efficiency range so as to assure a long travel distance per one battery discharge.

U.S. Pat. No. 5,528,087

Inventor: Yosimitu Sibata et al.

Issued: Jun. 18, 1996

A power supply apparatus for a hand-held terminal or the like. In response to a power supply switch turning on, a voltage of a battery is supplied to a boosting voltage circuit and maintained through a diode at a charge capacitor and then applied to a memory, thereby allowing the hand-held terminal to operate normally. While the power supply switch is turned off, the supply voltage stored in the capacitor and applied to the memory is compared with a reference voltage in a comparator. When the supply voltage is lower than the reference voltage, the comparator outputs a signal to a control circuit to couple the battery to the boosting circuit for a predetermined time so as to re-charge the capacitor and therefore guarantee back-up of the memory. This arrangement allows the use of the hand-held terminal for a longer time than is normally achieved concurrently with a normal operation of the hand-held device.

U.S. Pat. No. 5,610,498

Inventor: Byung K. Oh

Issued: Mar. 11, 1997

A circuit for controlling the charging of a battery and a method thereof, which are capable of discriminating residual voltage and charged voltage of a respective battery and an adapter by means of a central processing unit Such circuit for controlling the charging of a battery requires less hardware compared to conventional circuitry, so that the net cost for the product is reduced and power is conserved. Also malfunctions thereof are advantageously prevented, thereby enhancing product reliability.

SUMMARY OF THE PRESENT INVENTION

The present invention relates generally to motorized electric vehicles and, more specifically, to an electric vehicle assembly circuit connected within a vehicle that will extend the operating range of the vehicle battery by charging the battery during use.

A primary object of the present invention is to provide an electric vehicle assembly circuit that will overcome the shortcomings of prior art devices.

Another object of the present invention is to provide an electric vehicle assembly circuit which reduce the electrical discharge of the vehicle battery allowing the vehicle to drive a distance previously not obtainable without recharging.

A further object of the present invention is to provide an electric vehicle assembly circuit which is able to increase the time between charges of the battery.

An additional object of the present invention is to provide an electric vehicle assembly circuit which requires a fewer number of batteries than conventional electric vehicles to provide a sufficient charge.

A yet further object of the present invention is to provide an electric vehicle assembly circuit which is able to accommodate more than two passengers and able to achieve a high speed for travel on major thoroughfares.

A still further object of the present invention is to provide an electric vehicle assembly circuit which is able to provide the necessary power for operation of all the comforts and functions found in conventional gasoline driven vehicles such as a sound system, climate control system, electric windows, electric door locks, electrically adjustable seats, cruise control without limiting the operating distance the vehicle can travel or polluting the environment A yet further object of the present invention is to provide an electric vehicle assembly circuit which will shut down during charging if the keys are left in the ignition.

An even further object of the present invention is to provide an electric vehicle assembly circuit which will operate the horn and lights of the vehicle during an emergency situation.

Another object of the present invention is to provide an electric vehicle assembly circuit that is simple and easy to use.

A still further object of the present invention is to provide an electric vehicle assembly circuit that is economical in cost to manufacture.

Additional objects of the present invention will appear as the description proceeds.

An electric vehicle assembly circuit connected to a battery of an electric vehicle for charging the vehicle batteries during operation and thereby increasing the distance the vehicle is able to travel between battery charges is disclosed by the present invention. The vehicle batteries are divided into first, second, third and fourth sets of batteries. The electric vehicle assembly circuit includes a first processor connected to the first set of batteries, a first controller connected to receive power from said first processor and an alternator. A device is connected between the first controller and the alternator for driving the alternator. A second controller is connected to the alternator for charging the second and third sets of batteries during operation of the vehicle. A first converter connected to said alternator for providing a constant charge to the first set of batteries. A first relay is positioned between the first converter and the lights and horn of the vehicle for providing a constant power to the lights and horn. A second relay connects said first converter and a propulsion system of the vehicle providing power to the propulsion system during operation. An AC charger receives power from an external source for charging the first, second, third and fourth sets of batteries and a third relay disconnects the propulsion system from the first converter when the AC charger is receiving power from an external source.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

DESCRIPTION OF THE REFERENCED NUMERALS

Turning now descriptively to the drawings, in which similar reference characters denote similar elements throughout the several views, the Figures illustrate the electric vehicle assembly circuit of the present invention. With regard to the reference numerals used, the following numbering is used throughout the various drawing figures.

10 electric vehicle assembly circuit of the present invention
12 first battery
14 second battery
16 third battery
18 fourth battery
20 ignition switch
22 AC charger
24 fuse panel for accessories
26 circuit breaker
28 gear shift
30 transmission
32 wheels
34 first relay
36 second relay
38 third relay
40 fourth relay
42 fifth relay
44 sixth relay
46 first timer 48 second timer
50 third timer
52 first processor
54 second processor
56 first controller
58 second controller
60 third controller
62 fourth controller
64 first contactor
66 second contactor
68 third contactor
70 fourth contactor
71 first motor
72 motor 2A
73 motor 2B
74 motor 2C
76 motor 2D
78 motor 2E
80 third motor
82 first converter
84 converter 2A
86 converter 2B
88 converter 2C
90 converter 2D
92 converter 2E
94 third converter
96 fourth converter
98 first field
100 field 2A
102 field 2B
104 field 2C
106 field 2D
108 field 2E
110 first alternator
112 alternator 2A
114 alternator 2B
116 alternator 2C
118 alternator 2D
120 alternator 2E
122 ignition switch a
124 ignition switch b

DETAILED DESCRIPTION OF THE PREFERRED EMBODIMENT

Figure 1:
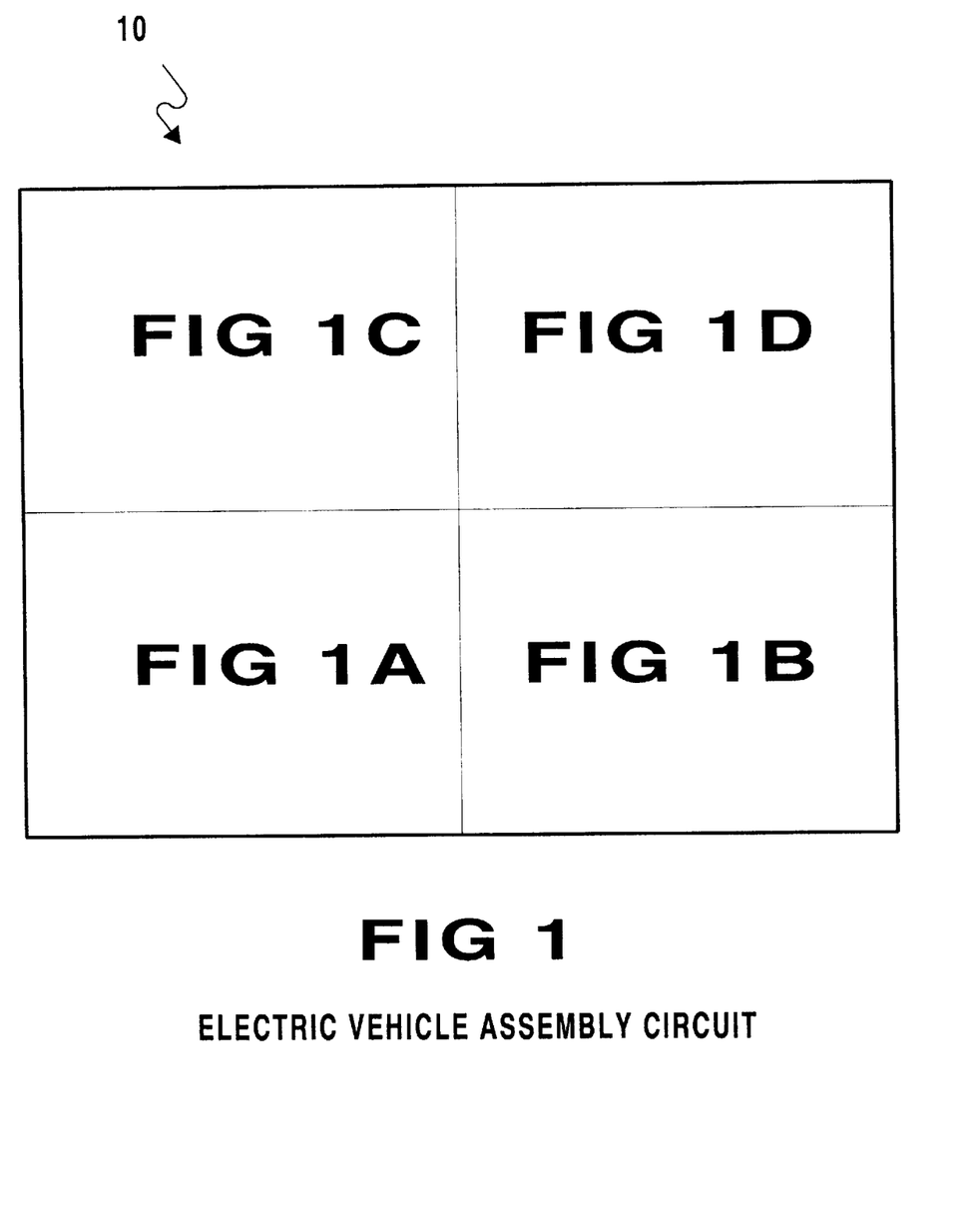
FIG. 1 is a diagrammatic overview of the interconnection of FIGS. 1A, 1B, 1C and 1D to form the electric vehicle assembly circuit of the present invention.
Figure 1A:
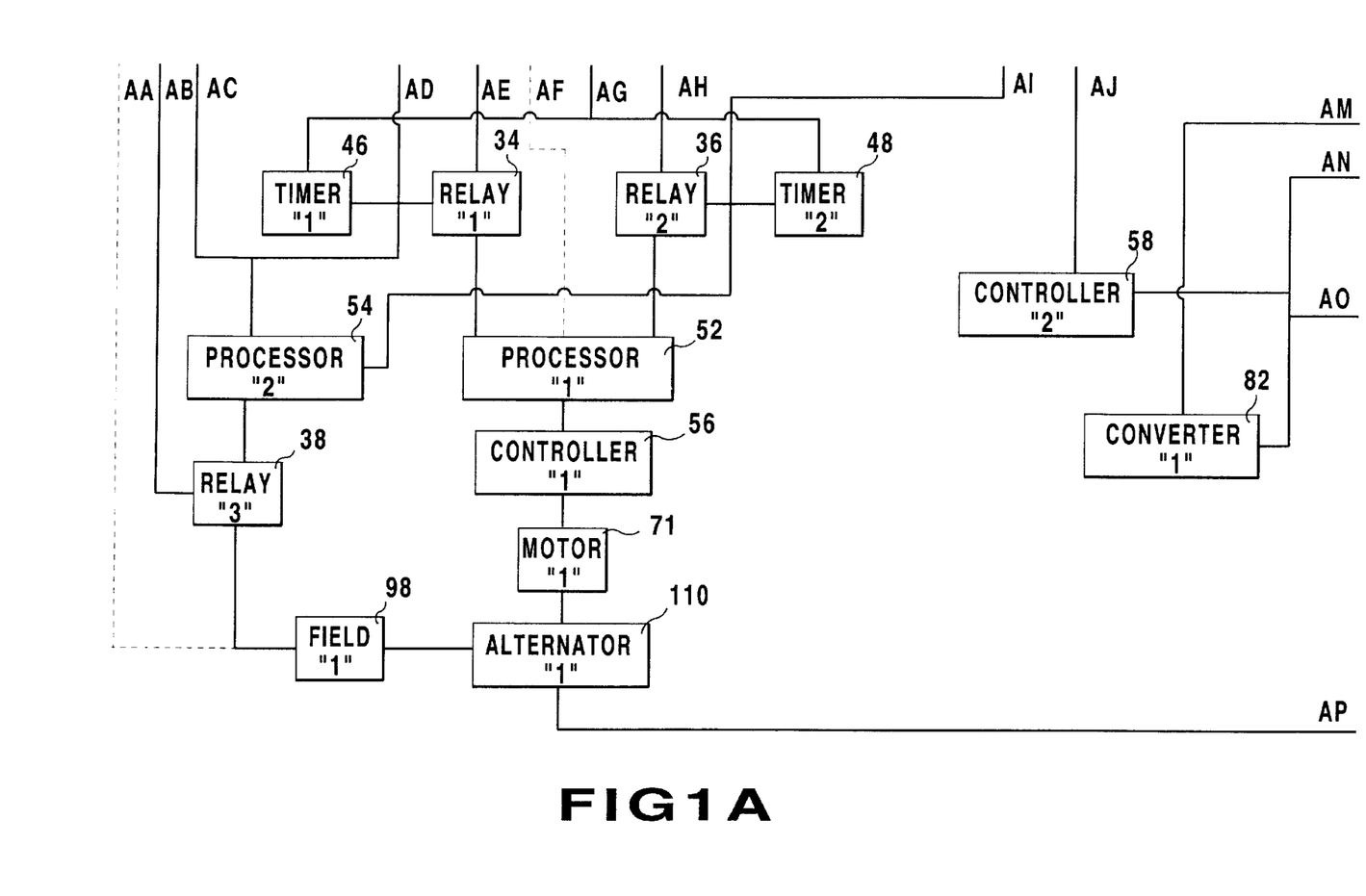
FIG. 1A is a partial schematic diagram of the electric vehicle assembly circuit of the present invention.
Figure 1B:
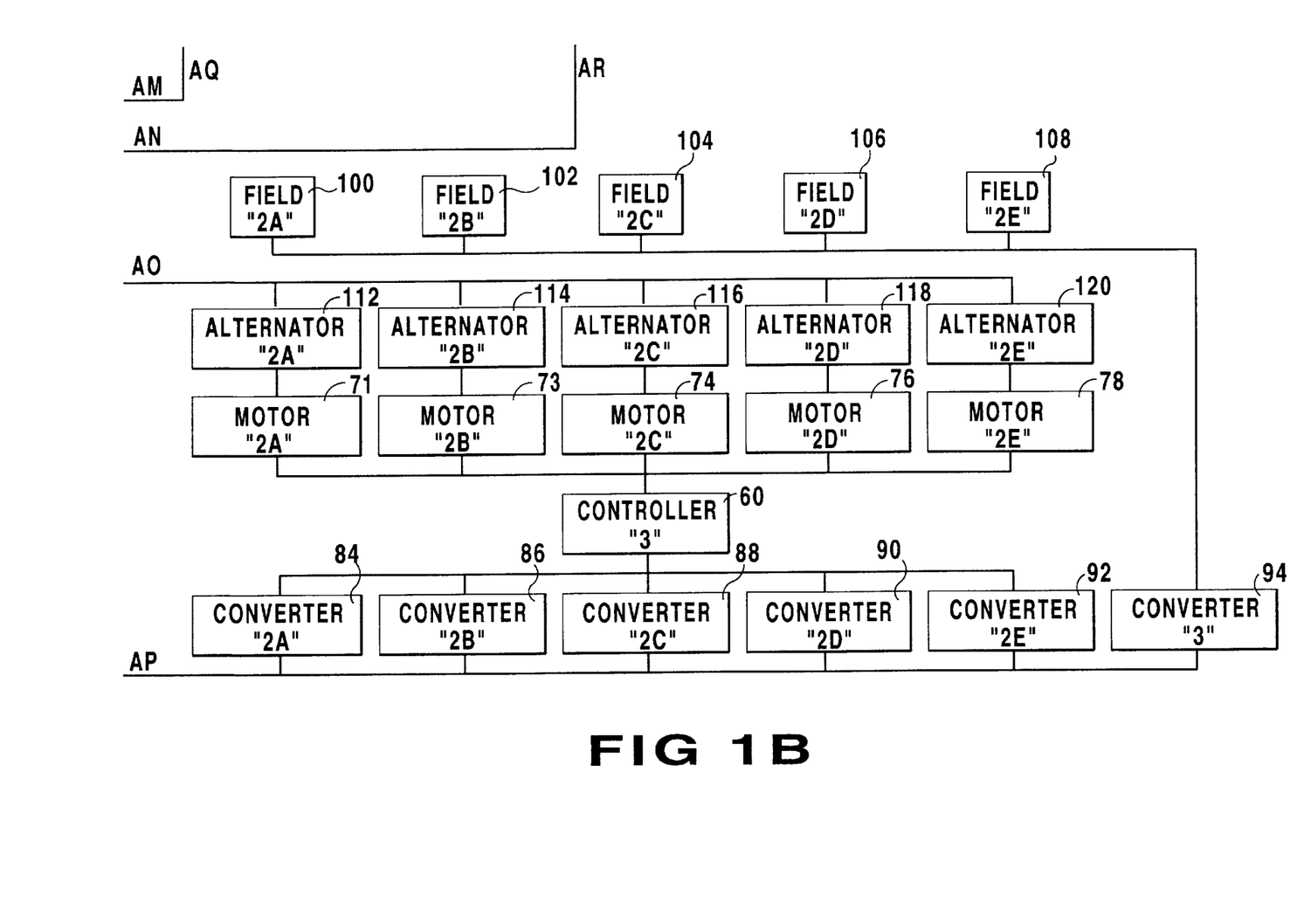
FIG. 1B is a further partial schematic diagram of the electric vehicle assembly circuit of the present invention.
Figure 1C:
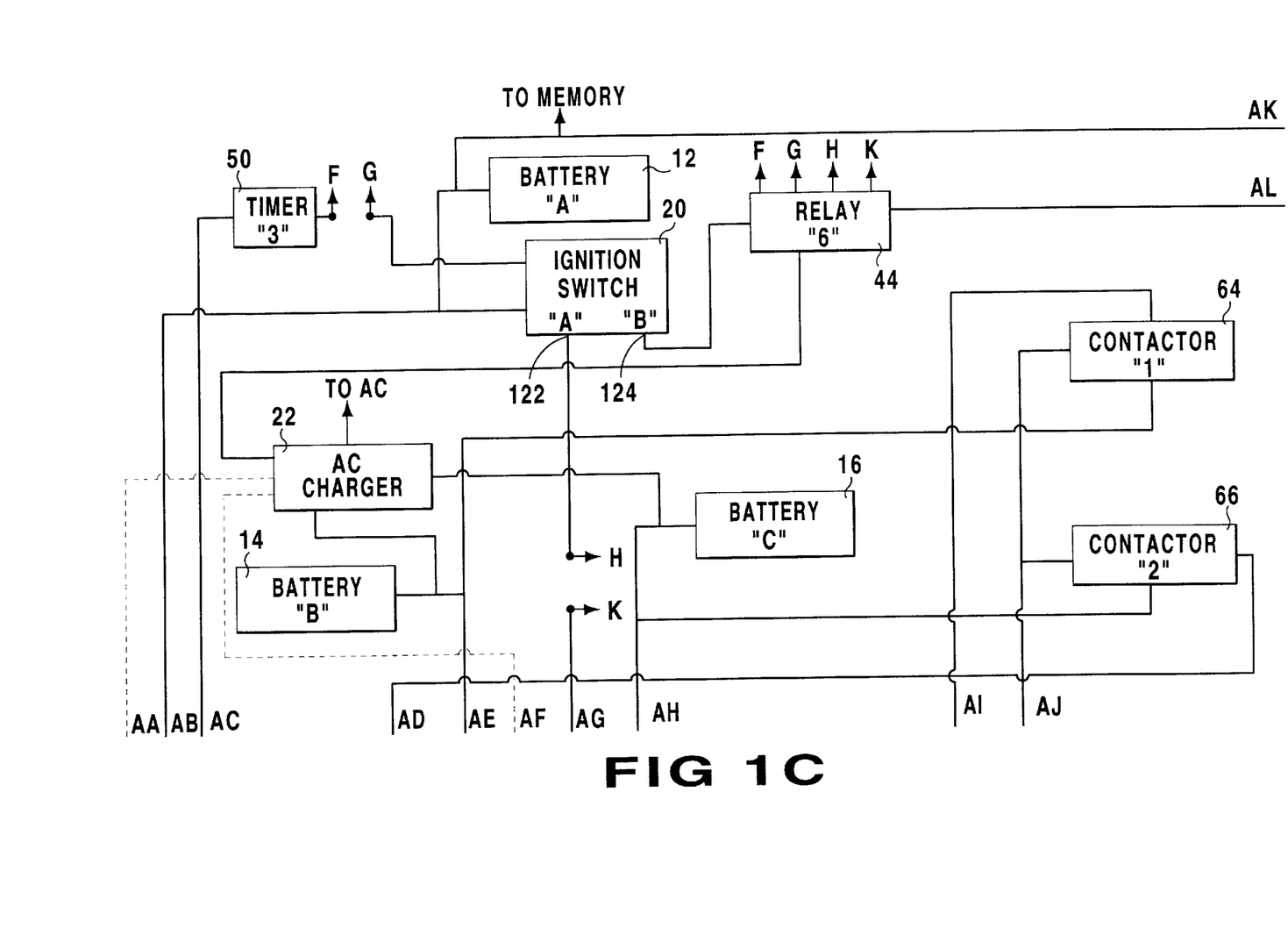
FIG. 1C is a further partial schematic diagram of the electric vehicle assembly circuit of the present invention.
Figure 1D:
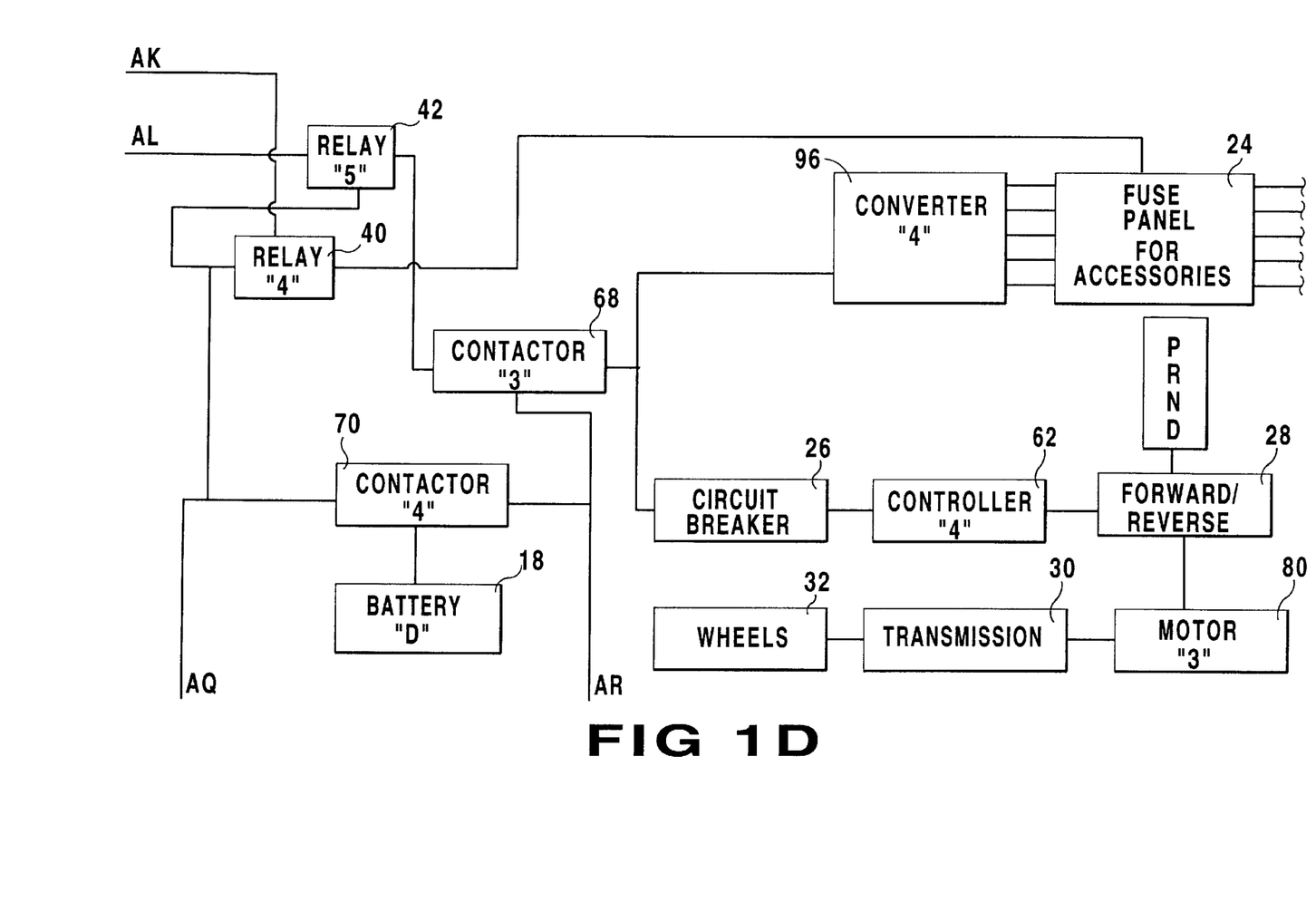
FIG. 1D is a further partial schematic diagram of the electric vehicle assembly circuit of the present invention.

Turning now descriptively to the drawings, FIGS. 1A–1D illustrate the electric vehicle assembly circuit of the present invention, its use and production method. The electric vehicle assembly circuit is indicated generally by the numeral 10.

The electric vehicle assembly circuit 10 of the present invention is clearly illustrated in the figures. The electric vehicle assembly circuit 10 includes four sets of batteries. A first battery indicated generally by the numeral 12 is a single battery; a second battery indicated generally by the numeral 14 consists of four batteries; a third battery indicated generally by the numeral 16 consists of four batteries; and a fourth battery indicated generally by the numeral 18 consists of ten batteries.

The first battery 12 is connected to both the ignition switch 20 and to a fourth relay 40. When the ignition switch is turned on, the first battery 12 will supply a voltage to the fourth relay 40. The ignition switch 20 is also connected to a first timer 46 and a second timer 48 through a terminal a indicated generally by the number 122. The first battery 12 is also connected to supply a voltage to the first and second timers 46 and 48, respectively, through the terminal a 122 of the ignition switch 20 when the ignition switch 20 is turned to the on position. The first timer 46 is connected to trigger a first relay 34 and the second timer 48 is connected to a second relay 36. The first and second timers 46 and 48 are controlled to alternately trigger the first and second relays 34 and 36 upon receipt of voltage from the first battery.

The second and third batteries 14 and 16 are both connected to supply a voltage to a first processor 52 through the first and second relays 34 and 36, respectively. Voltage is supplied to the first processor 52 by the second battery 14 when the first relay 34 is triggered by the first timer 46 and voltage is supplied to the first processor 52 by the third battery 16 when the second relay 36 is triggered by the second timer 48.

The first processor 52 is connected to a first controller 56 which drives a first alternator 110 via a first motor 68 connected therebetween. A second processor 54 is connected to receive a voltage from the first timer 46, second timer 48 and a third timer 50. The third timer 50 is connected between the ignition switch 20 and the second processor 54. The second processor 54 will trigger a third relay 38. The voltage received from the first battery 12 is fed through the second processor 54 and the third relay 38 to supply a field voltage for the first alternator 110.

The first alternator 110 is connected to deliver a voltage to a converter 2A indicated by the numeral 84, a converter 2B indicated by the numeral 86, a converter 2C indicated by the numeral 88, a converter 2D indicated by the numeral 90, a converter 2E indicated by the numeral 92 and a converter 94. Voltage from converter 84, converter 86, converter 88, converter 90 and converter 92 are fed to a third controller 60.

The third controller 60 provides voltage to each of a motor 2A indicated by the numeral 71, a motor 2B indicated by the numeral 72, a motor 2C indicated by the numeral 73, a motor 2D indicated by the numeral 74 and a motor 2E indicated by the numeral 76. Each motor is in turn connected to drive a respective attenuator. Motor 2A drives an attenuator 2A indicated by the numeral 112, motor 2B drives an attenuator 2B indicated by the numeral 114, motor 2C drives an attenuator 2C indicated by the numeral 116, motor 2D drives an attenuator 2D indicated by the numeral 118 and motor 2E drives an attenuator 2E indicated by the numeral 120. Each of the alternators 112, 114, 116, 118 and 120 are connected to feed a voltage to a first converter 82, a fourth contactor 70 and a second controller 58.

The second controller 58 supplies the voltage received from the alternators 112, 114, 116, 118 and 120 to first and second contactors 64 and 66 which are controlled by the first and second relays 34 and 36 to alternately charge the second and third batteries. The voltage received by the first converter 82 is connected to provide a constant voltage to the first battery 12 and trigger the fourth relay 40, the third contactor 68 and a fourth contactor 70.

The fourth relay 40 provides voltage for the lights and the horn only. A fifth relay 42 is also triggered by the first converter 82 and supplies power to the propulsion system and accessory system 24. The propulsion system includes the forward/reverse switch 28 controlling the direction the vehicle will travel, a third motor 80, a transmission system 30 and wheels of the vehicle 32.

A sixth relay 44 is a safety relay activated only when the vehicle is being recharged. Recharging of the vehicle may be accomplished by connection to a 110 VAC household current The sixth relay 44 is connected to an AC charger 22 which provides the connection port for receipt of the charging voltage. The sixth relay 44 acts to disable the propulsion and accessory systems when triggered by the charging voltage.

The third contactor 68 connected to receive a voltage supply from the alternators 112, 114, 116, 118 and 120 provides a voltage via a fourth contactor and the fourth battery 18 to a fourth converter 96 which is connected to supply a voltage for operation of the accessory systems via the fuse panel 24.

A fourth contactor 70 is connected to provide a voltage from the fourth battery 18 to a third contactor 68, a circuit breaker 26, a fourth controller 62. The fourth contactor 70 is also connected to provide a voltage from the fourth battery 18 to the third motor 80 via a drive circuit 28 and a transmission 30.

An AC charger is connected to disable the propulsion system via the sixth relay and charges the first, second, third and fourth batteries 12, 14, 16 and 18, respectively.

The operation of the electric vehicle assembly circuit 10 of the present invention will now be described with reference to the figures. In operation, when the ignition switch 20 is turned on, the first battery 12 will supply a voltage to trigger the fourth relay 40, the first timer 46 and the second timer 48 through terminal a 122 of the ignition switch 20. The first timer 46 will trigger the first relay 34 and the second timer 48 will trigger the second relay 36 in alternating fashion under the control of the voltage received from the first battery 12 through terminal a 122 of the ignition switch 20. The second battery supplies a voltage to the first processor 52 through the second relay 34 when the second relay is triggered and the third battery 16 supplies a voltage to the first processor 52 through the second relay 36 when the third relay is triggered.

Upon receipt of the voltage from the second and third batteries 14 and 16, respectively, the first processor 52 drives a first alternator 110 via the first controller 56 the first motor 68. The second processor 54 receive a voltage from the first, second and third timers 46, 48 and 50 and triggers the third relay 38 in response to receipt of the voltage. The voltage from the first battery 12 is then fed through the second processor 54 and third relay 38 to supply a field voltage for the first alternator 110.

The first alternator 110 provides a voltage to converters 84, 86, 88, 90, 92 and 94. Converters 84, 86, 88, 90 and 92 provide voltage to the third controller 60. The third controller 60 provides voltage to motors 71, 72, 73, 74, 76 and 78. Each motor 71, 72, 73, 74, 76 and 78 in turn drives their respective attenuator 112, 114, 116, 118 and 120. Voltage from each alternator 112, 114, 116, 118 and 120 is then fed to the first converter 82, fourth contactor 70 and second controller 58. The first converter 82 provides a constant voltage to the first battery 12 and to trigger the fourth relay 40, the third contactor 68 and a fourth contactor 70. The second controller 58 supplies the voltage to the first and second contactors 64 and 66 which are controlled by the first and second relays 34 and 36 to alternately charge the second and third batteries. Thus, the second and third batteries are charged while the ignition is in the on position and the vehicle is running.

The fourth relay 40 provides voltage from the fourth battery 18 for the lights and the horn only thereby allowing use of the lights and horn even when the ignition is in the off position and the vehicle is not running. The fifth relay 42 is also triggered by the first converter 82 and supplies power to the propulsion system and accessory system 24. The sixth relay 44 is triggered when the AC charger is connected to receive a charging current to disable the propulsion and accessory systems and thereby prevent the vehicle from moving during charging of the batteries.

The third contactor 68 provides a voltage received from the alternators 112, 114, 116, 118 and 120 via a fourth contactor and the fourth battery 18 to a fourth converter 96 for supplying a voltage for operation of the accessory systems via the fuse panel 24.

From the above description it can be seen that the electric vehicle assembly circuit of the present invention is able to overcome the shortcomings of prior art devices by providing an electric vehicle assembly circuit which reduces the electrical discharge of the vehicle battery allowing the vehicle to drive over an increased range than previously obtainable and thereby increase the time between charges of the battery. The electric vehicle assembly circuit requires a fewer number of batteries than conventional electric vehicles to provide a sufficient charge while being able to travel a larger distance between charging of the battery. The electric vehicle assembly circuit is also able to accommodate more than two passengers and able to achieve a high speed for travel on major thoroughfares and provide all the comforts and functions found in conventional gasoline driven vehicles while preventing pollution of the environment Furthermore, the electric vehicle assembly circuit of the present invention is simple and easy to use and economical in cost to manufacture.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An electric vehicle assembly circuit connected to a battery of an electric vehicle for charging the vehicle batteries during operation and thereby increasing the distance the vehicle is able to travel between battery charges, the vehicle batteries being divided into first, second, third and fourth sets of batteries, said electric vehicle assembly circuit comprising:

a) a first processor connected to the first set of batteries;
   b) a first controller connected to receive power from said first processor;
   c) an alternator;
   d) means connected to receive power from said first controller for driving said alternator;
   e) a second controller connected to said alternator for charging the second and third sets of batteries during operation of the vehicle;
   f) a first converter connected to said alternator for providing a constant charge to the first set of batteries;
   g) a first relay positioned between said first converter and lights and horn of the vehicle for providing a constant power to the lights and horn;

h) second relay means for connecting said first converter and a propulsion system of the vehicle providing power to the propulsion system during operation;

i) means for receiving power from an external source for charging the first, second, third and fourth sets of batteries; and j) third relay means for disconnecting the propulsion system from said first converter when said means for charging is receiving power from an external source.

2. The electric vehicle assembly circuit of claim 1, further comprising fourth relay means for alternately connecting said processor to said second and third sets of batteries in alternating fashion to thereby alternately charge the second and third sets of batteries during operation.

3. The electric vehicle assembly circuit of claim 1, wherein said means for driving includes:

a) a second converter for receiving power from said first and second sets of batteries;

b) a controller connected to receive power from said first processor; and c) motor means connected to receive power from said controller for driving said alternator.

4. The electric vehicle assembly circuit of claim 3, further comprising fourth relay means for alternately connecting said means for driving to said second and third sets of batteries to drive said alternator with the second and third sets of batteries in alternating fashion during operation.

5. The electric vehicle assembly circuit of claim 3, further comprising third converter means for supplying a field voltage for said alternator.

6. The electric vehicle assembly circuit of claim 1, further comprising fourth converter means connected between said alternator and the first set of batteries for charging the first set of batteries during operation.

7. The electric vehicle assembly circuit of claim 6, wherein said fourth converter means is connected to trigger said first relay means.

8. The electric vehicle assembly circuit of claim 1, wherein the first set of batteries includes one battery.

9. The electric vehicle assembly circuit of claim 1, wherein the second set of batteries includes four batteries.

10. The electric vehicle assembly circuit of claim 1, wherein the third set of batteries includes four batteries.

11. The electric vehicle assembly circuit of claim 1, wherein the fourth set of batteries includes ten batteries.

12. The electric vehicle assembly circuit of claim 1, wherein the first set of batteries includes one battery, the second set of batteries includes four batteries, the third set of batteries includes four batteries and the fourth set of batteries includes ten batteries.

13. The electric vehicle assembly circuit of claim 1, wherein the first set of batteries is connected directly to the vehicle ignition.

* * * * *